(12) United States Patent
Kitahata et al.

(10) Patent No.: US 8,527,130 B2
(45) Date of Patent: Sep. 3, 2013

(54) HYBRID DRIVE APPARATUS AND CONTROLLER FOR HYBRID DRIVE APPARATUS

(75) Inventors: Takeshi Kitahata, Toyota (JP); Tatsuo Obata, Toyota (JP); Takeshi Kuwahara, Nisshin (JP); Hiromichi Kimura, Okazaki (JP); Toru Saito, Toyota (JP); Masahiro Tanae, Okazaki (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 162 days.

(21) Appl. No.: 13/306,401

(22) Filed: Nov. 29, 2011

(65) Prior Publication Data

US 2012/0143422 A1 Jun. 7, 2012

(30) Foreign Application Priority Data

Dec. 6, 2010 (JP) ................................. 2010-271655

(51) Int. Cl.
*B60L 11/00* (2006.01)

(52) U.S. Cl.
USPC ............. 701/22; 701/24; 701/36; 701/37; 903/903; 903/905; 903/906; 903/909; 903/910; 180/65.21; 180/165; 180/65.27; 180/65.28; 180/65.31; 318/139; 318/146; 477/5; 60/718

(58) Field of Classification Search
USPC .......... 701/22, 24, 36, 37; 903/903, 905, 903/906, 909, 910, 912, 914, 916, 918, 919, 903/945, 946, 947, 951, 952; 180/65.27, 180/65.245, 65.29, 65.285, 65.25, 65.28, 180/165, 65.6, 65.21, 65.23, 65.31, 65.225, 180/65.235; 318/139, 146; 310/113, 114, 310/112; 322/16; 60/718; 477/5; 165/41
See application file for complete search history.

(56) References Cited

U.S. PATENT DOCUMENTS

| | | | | |
|---|---|---|---|---|
| 5,249,637 A | * | 10/1993 | Heidl et al. | 180/65.25 |
| 5,327,987 A | * | 7/1994 | Abdelmalek | 180/65.25 |
| 5,403,244 A | * | 4/1995 | Tankersley et al. | 477/20 |
| 5,495,906 A | * | 3/1996 | Furutani | 180/65.23 |
| 5,513,719 A | * | 5/1996 | Moroto et al. | 180/65.21 |
| 5,713,425 A | * | 2/1998 | Buschhaus et al. | 180/65.25 |
| 5,713,814 A | * | 2/1998 | Hara et al. | 477/5 |

(Continued)

FOREIGN PATENT DOCUMENTS

| | | |
|---|---|---|
| JP | A-2005-008143 | 1/2005 |
| JP | A-2005-061450 | 3/2005 |
| JP | A-2008-238837 | 10/2008 |

*Primary Examiner* — McDieunel Marc
(74) *Attorney, Agent, or Firm* — Oliff & Berridge, PLC

(57) ABSTRACT

A hybrid drive apparatus includes: a drive power source that includes an internal combustion engine, a first electric motor, and a second electric motor; a power transmission mechanism that includes a carrier, a sun gear, and a ring gear, and that is configured to rotate the output shaft of the internal combustion engine by the first electric motor; and plural bearings that each includes an outer ring member and an inner ring member fitted to the outer ring member through a rolling element, and that are provided apart from each other in an axial direction of the output shaft with the carrier being positioned between the bearings. An inner periphery of the outer ring member is positioned more inward in a radial direction of the ring gear relative to a meshing portion between inner teeth of the ring gear and outer teeth of one of the pinion gears.

10 Claims, 11 Drawing Sheets

(56) References Cited

U.S. PATENT DOCUMENTS

| | | | |
|---|---|---|---|
| 5,778,997 A | * | 7/1998 | Setaka et al. ............. 180/65.245 |
| 5,788,597 A | * | 8/1998 | Boll et al. .......................... 477/4 |
| 6,155,364 A | * | 12/2000 | Nagano et al. ........... 180/65.235 |
| 6,173,574 B1 | * | 1/2001 | Obayashi et al. ................ 60/710 |
| 6,205,379 B1 | * | 3/2001 | Morisawa et al. ............... 701/22 |

* cited by examiner

HYBRID DRIVE APPARATUS AND CONTROLLER FOR HYBRID DRIVE APPARATUS

INCORPORATION BY REFERENCE

The disclosure of Japanese Patent Application No. 2010-271655 filed on Dec. 6, 2010 including the specification, drawings and abstract is incorporated herein by reference in its entirety.

BACKGROUND OF THE INVENTION

1. Field of the Invention

The present invention relates to a hybrid drive apparatus and a controller for the hybrid drive apparatus. More particularly, the present invention relates to a hybrid drive apparatus that is configured to allow a vehicle to use only an electric motor as a drive power source to travel in motor drive mode when rotational driving of an internal combustion engine is stopped, and relates to a controller for the hybrid drive apparatus.

2. Description of Related Art

Conventionally-known hybrid vehicles use an internal combustion engine and a motor generator (an electric motor) as a drive power source to rotate an output shaft of the internal combustion engine. The rotations of the output shaft activate an oil pump to supply lubricant from the oil pump to a power transmission mechanism. The conventionally-known hybrid vehicles are configured to transmit a rotational torque of the motor generator to the oil pump to supply lubricant from the oil pump to the power transmission mechanism, when the vehicle travels in an electric vehicle drive mode (EV drive mode) in which rotational driving of the internal combustion engine is stopped.

For example, one of the conventionally-known hybrid vehicles uses a planetary gear mechanism as the power transmission mechanism to distribute an output of the internal combustion engine to the drive wheels and to the motor generator. When the vehicle travels in a hybrid drive mode (HV drive mode), a rotational torque of the output shaft of the internal combustion engine activates the oil pump. When the vehicle travels in the motor drive mode (EV drive mode), a rotational torque of the motor generator forces the output shaft of the internal combustion engine to rotate to activate the oil pump.

However, in a case where the motor generator is kept driven while the vehicle travels in the motor drive mode (EV drive mode), this causes the amount of battery consumed by the motor generator to excessively increase. This can possibly cause some problems, such as reducing a traveling distance of the vehicle in the EV drive mode.

Thus, a hybrid drive apparatus disclosed in Japanese Patent Application No. 2008-238837 (JP-A-2008-238837) is configured to determine whether the power transmission mechanism needs to be supplied with lubricant based on a distance that the vehicle has travelled in the EV drive mode in which the rotational driving of the internal combustion engine is stopped, or based on an amount of electrical energy stored in the capacitor. If the hybrid drive apparatus determines that the power transmission mechanism needs to be supplied with lubricant, the hybrid drive apparatus drives the internal combustion engine to rotate.

The hybrid drive apparatus disclosed in JP-A-2008-238837 activates the oil pump at an appropriate timing, when the vehicle is in the EV drive mode, to prevent the planetary gear mechanism which serves as the power transmission mechanism under no lubrication condition from seizure or other problems. It allows the power transmission mechanism to be supplied with the lubricant intermittently. The hybrid drive apparatus needs not to activate the oil pump constantly. It results in minimizing the amount of battery consumed by the motor generator, and therefore results in an increase in traveling distance of the vehicle in the EV drive mode.

However, such a conventional hybrid drive apparatus as disclosed above has to drive the motor generator to rotate the output shaft of the internal combustion engine at a rotational speed at which the oil pump discharges oil, in order for the oil to be supplied to the power transmission mechanism.

As the output shaft of the internal combustion engine rotates at a lower rotational speed, a larger amount of oil leaks from the oil pump, and thus the oil pump has lower discharge efficiency. Therefore, the rotational speed of the output shaft needs to be increased approximately to the idling speed at which the oil pump supplies a sufficient amount of oil to the power transmission mechanism.

The motor generator is kept driven for a certain period of time until the output shaft of the internal combustion engine rotates at a rotational speed at which the oil pump can discharge a sufficient amount of oil. Accordingly, the amount of battery consumed by the motor generator may undesirably increase.

SUMMARY OF THE INVENTION

The present invention provides a hybrid drive apparatus that prevents excessive battery consumption and that allows a power transmission mechanism to be lubricated when a vehicle travels in a motor drive mode in which rotational driving of an internal combustion engine is stopped. The present invention also provides a controller for the hybrid drive apparatus.

A first aspect of the present invention relates to a hybrid drive apparatus including: a drive power source that includes an internal combustion engine, a first electric motor, and a second electric motor; a power transmission mechanism that includes a carrier that is coupled to an output shaft of the internal combustion engine and that rotatably supports plural pinion gears, a sun gear that is coupled to a rotational shaft of the first electric motor and that meshes with the pinion gears, and a ring gear that is coupled to a driving axle and that meshes with the pinion gears, the power transmission mechanism being configured to rotate the output shaft of the internal combustion engine by the first electric motor; and plural bearings that each includes an outer ring member that is provided on an inner periphery of the ring gear, and an inner ring member that is provided on an outer periphery of a support portion of a case and that is rotatably fitted to the outer ring member through a rolling element, the bearings being apart from each other in an axial direction of the output shaft and the carrier being positioned between the bearings, wherein the bearings are each fitted onto the support portion of the case such that an inner periphery of the outer ring member of the bearing is positioned more inward in a radial direction of the ring gear relative to a meshing portion between inner teeth of the ring gear and outer teeth of one of the pinion gears.

In the hybrid drive apparatus described above, the bearings are each fitted onto the support portion of the case such that the inner periphery of the outer ring member of the bearing is positioned more inward in the radial direction of the ring gear relative to the meshing portion between the inner teeth of the ring gear and the outer teeth of one of the pinion gears.

According to this structure, a lubricant reservoir is defined at the bottom of the ring rear by the inner periphery of the ring gear and a pair of the bearings. The lubricant reservoir allows the pinion gears to be immersed in the lubricant.

Therefore, no lubricant needs to be supplied from the oil pump to the power transmission mechanism when the vehicle travels in the motor drive mode in which rotational driving of the internal combustion engine is stopped. Accordingly, unlike the conventional hybrid drive apparatuses, the first electric motor needs not to be driven to rotate the output shaft of the internal combustion engine at a rotational speed at which the oil pump supplies lubricant to the power transmission mechanism. This prevents excessive battery consumption, while allowing the power transmission mechanism to be lubricated.

A second aspect of the present invention relates to a controller for the hybrid drive apparatus according to the first aspect of the present invention. The controller including: a drive mode determining unit that determines whether a drive mode of a vehicle is changed to a motor drive mode; and an electric motor controlling unit that controls the first electric motor based on the determination result of the drive mode determining unit, wherein the electric motor controlling unit drives the first electric motor to rotate the output shaft of the internal combustion engine by a predetermined rotational angle when a specific condition is satisfied after the drive mode of the vehicle is changed to the motor drive mode.

According the controller for the hybrid drive apparatus described above, the first electric motor is driven to rotate the output shaft of the internal combustion engine by a given rotational angle when a specific condition is satisfied after the drive mode of the vehicle is changed to the motor drive mode. This allows all the pinion gears to be immersed in the lubricant.

Therefore, no lubricant needs to be supplied from the oil pump to the power transmission mechanism when the vehicle travels in the motor drive mode in which rotational driving of the internal combustion engine is stopped. Accordingly, unlike the conventional hybrid drive apparatuses, the first electric motor needs not to be driven to rotate the output shaft of the internal combustion engine at a rotational speed at which the oil pump supplies lubricant to the power transmission mechanism. This prevents excessive battery consumption, while allowing the power transmission mechanism to be lubricated.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A hybrid drive apparatus and a controller for the hybrid drive apparatus according to first to fourth embodiments of the present invention will be described below with reference to the accompanying drawings.

First Embodiment

FIG. 1 to FIG. 6 illustrate a hybrid drive apparatus and a controller for the hybrid drive apparatus according to the first embodiment of the present invention.

Figure 1:
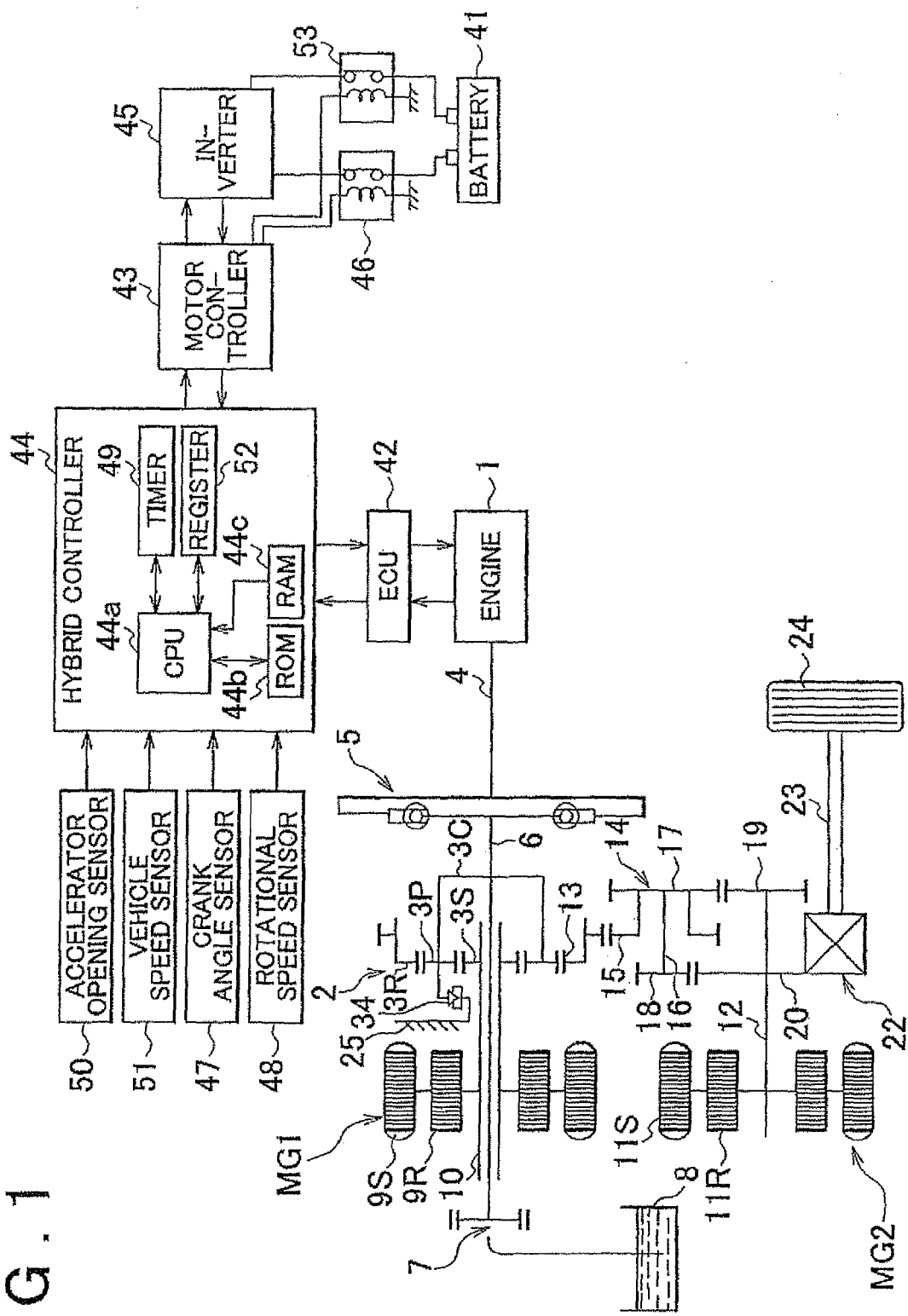
FIG. 1 is a schematic system configuration diagram of a power supply system, which focuses on a transaxle of a hybrid vehicle, according to a first embodiment of a hybrid drive apparatus and a controller for the hybrid drive apparatus of the present invention.

A configuration of the hybrid drive apparatus and the controller for the hybrid drive apparatus will be first described. In FIG. 1, a transaxle serves as the hybrid drive apparatus and includes a motor generator MG1, a motor generator MG2, and a transfer gearbox (power transmission mechanism) 2. The motor generator MG1 converts kinetic energy of an engine 1, which serves as an internal combustion engine, into electrical energy. The motor generator MG2 serves as an auxiliary drive power source for the engine 1. The transfer gearbox 2 distributes an output of the engine 1 to two systems, that is, the motor generator MG1 and drive wheels 24. The engine 1, the motor generator MG1, and the motor generator MG2 form the drive power source. The motor generator MG1 serves as a first electric motor, while the motor generator MG2 serves as a second electric motor.

Figure 2:
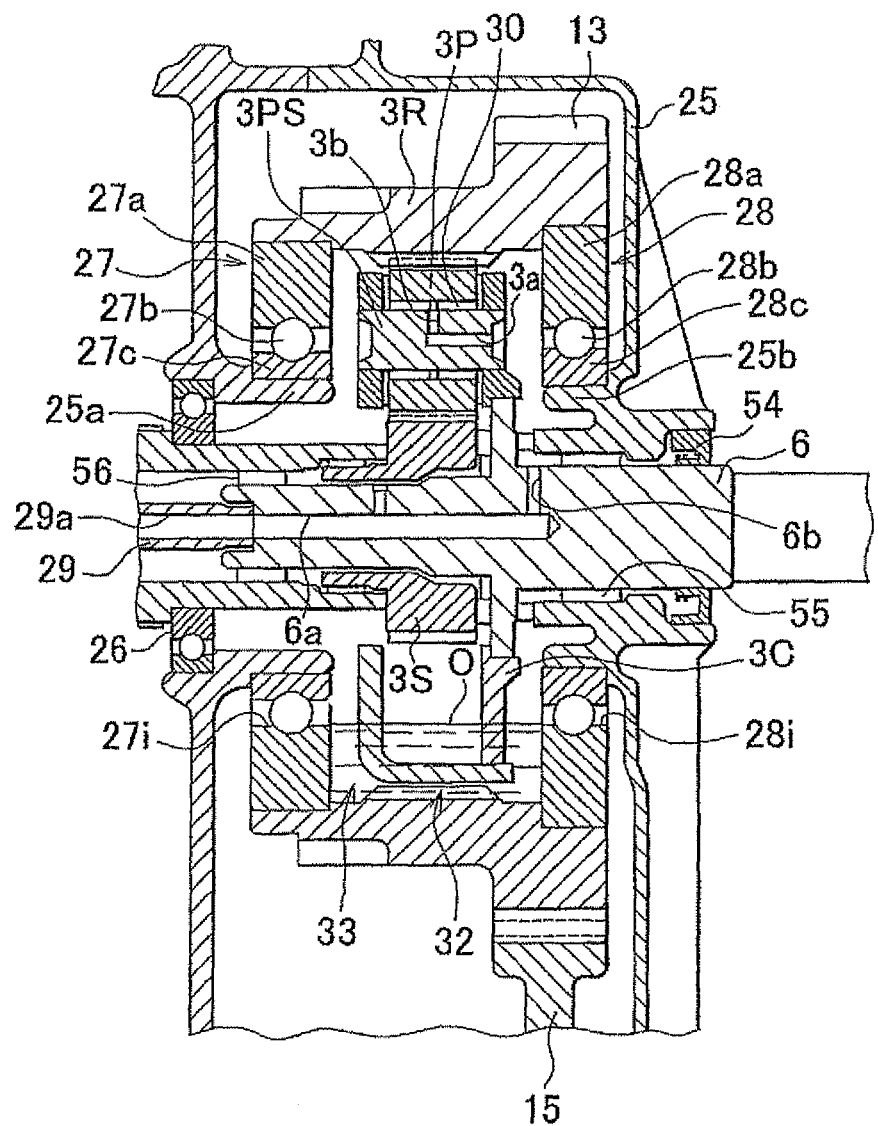
FIG. 2 is a sectional view of a transfer gearbox according to the first embodiment of the hybrid drive apparatus and the controller for the hybrid drive apparatus of the present invention.

As illustrated in FIG. 1 and FIG. 2, a planetary gear mechanism is used as the transfer gearbox 2. The transfer gearbox 2 includes: a sun gear 3S; pinion gears 3P; a ring gear 3R; and a carrier 3C. The sun gear 3S is an outer-tooth gear at the center of the plural gear elements and rotates on its axis. The pinion gears 3 are outer tooth gears which are rotate and revolve around the sun gear 3S while circumferentially coming into contact with the sun gear 3S. The ring gear 3R is an inner tooth gear formed into an ring shape to mesh with the pinion gears 3P. The carrier 3C supports the pinion gears 3P rotatably through their respective pinion shafts 3PS, while rotating with the revolution of the pinion gears 3P.

The carrier 3C connected to a one-way clutch 34. The one-way clutch 34 prevents the engine 1 from rotating in the reverse direction. The one-way clutch 34 is fitted to a case 25 (a part of the case 25 is illustrated in FIG. 2) for the transaxle.

A rotational torque is produced. The rotational torque, which is produced by rotational drive of the engine 1, is transmitted to an input shaft 6 through a crankshaft 4 of the engine 1 and a coil spring transaxle damper 5. An oil pump 7 is disposed on the axis of the input shaft 6. According to the first embodiment of the present invention, the input shaft 6 serves as an output shaft of the engine 1 and the power of the engine 1 is transmitted to the input shaft 6 through the crankshaft 4.

The oil pump 7 is activated, for example, when the rotational torque of the input shaft 6 is provided to the oil pump 7. The oil pump 7 may be a trochoid pump, a gear pump or other pumps.

An oil pan 8 is filled with oil, which is an example of lubricant. The lubricant is sucked by the oil pump 7, and is then delivered to components of the power supply system, such as the transfer gearbox 2, to circulate through rotational parts and slidable parts of the gear elements and shafts. The lubricant not only cools the components, but also serves to reduce friction resistance, inhibit corrosion and keep air sealing.

The motor generator MG1 is an alternate current (AC) synchronous generator. The AC synchronous generator includes a motor shaft 10, a rotor 9R, and a stator 9S. The rotor 9R is fitted to the motor shaft 10 and is made of a permanent magnet. The stator 9S is wound with a three-phase winding. The motor shaft 10 is a rotational shaft arranged around the input shaft 6 and coaxially with the input shaft 6. The motor generator MG1 supplies electrical power to be used for charging a battery 41 and for driving the motor.

The motor generator MG2 is an AC synchronous generator. The AC synchronous generator includes a motor shaft 12, a rotor 11R, and a stator 11S. The rotor 11R is fitted to the motor shaft 12 and is made of a permanent magnet. The stator 11S is wound with a three-phase winding. The motor shaft 12 is a rotatable shaft arranged parallel to the input shaft 6. When a three-phase AC current is supplied to the three-phase winding, the motor generator MG2 generates a rotating magnetic field within the motor generator MG2 to output a predetermined rotational torque. The motor generator MG2 serves as an auxiliary drive power source to assist the engine 1. As an auxiliary drive power source for the engine 1, the motor generator MG2 assists the vehicle in smooth startup and acceleration, and converts the kinetic energy of the vehicle into electrical energy to charge the battery 41 when regenerative braking is working.

The battery 41 may have a structure in which several battery modules are connected in series as appropriate to provide the required voltage rating.

As illustrated in FIG. 1 and FIG. 2, in the transfer gearbox 2, the carrier 3C is coupled to the input shaft 6 of the engine 1, while the sun gear 3S is coupled to the motor shaft 10. The ring gear 3R is integrated with a counter drive gear 13. The counter drive gear 13 is connected through a gear train 14 to the motor generator MG2 and to a drive shaft 23. In other words, the ring gear 3R is coupled to the motor generator MG2 and the drive shaft 23. It should be understood that the ring gear 3R according to the first embodiment of the present invention includes inner teeth portion in which inner teeth are formed and non-inner teeth portion in which inner teeth are not formed. The non-inner teeth portion corresponds to an inner periphery of the ring gear 3R. The drive shaft 23 serves as a driving axle.

The transfer gear box 2 transmits part of the output of the engine 1 to the drive wheels 24 through the input shaft 6, the carrier 3C, the pinion gears 3P, the ring gear 3R, and the counter drive gear 13. Further, the transfer gear box 2 transmits part of the output of the engine 1 to the rotor 9R of the motor generator MG1 through the input shaft 6, the carrier 3C, the pinion gear 3P, and the sun gear 3S, to utilize for electrical power generation.

The transaxle according to the first embodiment of the present invention has a four-axis gear train. On a first axis of the gear train, the input shaft 6, the motor generator MG1, the transfer gearbox 2, and the counter drive gear 13 are arranged. The input shaft 6 is a center of the motor generator MG1, the transfer gearbox 2, and the counter drive gear 13.

On a second axis of the gear train, the counter drive shaft 16, a first counter driven gear 15, a second counter driven gear 17, and a differential drive pinion 18 are arranged. A rotational torque of the counter drive gear 13 is transmitted to the first counter driven gear 15. The second counter driven gear 17 is integrated with the first counter driven gear 15 and fitted to one end of the counter drive shaft 16. The differential drive pinion 18 is provided at the other end of the counter drive shaft 16. The counter drive shaft 16 is a center of the first counter driven gear 15, the second counter driven gear 17, and the differential drive pinion 18.

The first counter driven gear 15, the second counter driven gear 17, and the differential drive pinion 18 form the gear train 14.

On a third axis of the gear train, the motor generator MG2 and a counter drive gear 19 are arranged. The counter drive gear 19 is provided at one end of the motor shaft 12 to transmit rotations of the rotor 11R to the counter driven gear 17.

On a fourth axis of the gear train, a differential ring gear 20, a differential 22, and a drive shaft 23 are arranged. The power is transmitted from the differential drive pinion 18 to the differential ring gear 20. The differential 22 distributes the rotational torque to the inner and outer drive wheels 24 in such a manner as to absorb a rotational difference between the inner and outer drive wheels 24. A differential output of the differential 22 is transmitted to the drive wheels 24 through the drive shaft 23.

An engine control unit (ECU) 42, a hybrid controller 44, and a motor controller 43 serves as a system controller that controls the power supply system. The ECU 42 controls fuel injection, injection timing, variable valve timing and so on for the engine 1 based on various sensor outputs from a crank position sensor, a cam position sensor, a throttle position sensor, and other sensors (not illustrated). The hybrid controller 44 obtains a required engine output and a required torque of the motor generators MG1 and MG2 based on information detected by an accelerator operation amount sensor 50 and by a vehicle speed sensor 51. The accelerator operation amount sensor 50 detects an accelerator operation amount. The vehicle speed sensor 51 detects a vehicle speed. The hybrid controller 44 then outputs required values to the motor controller 43 and the ECU 42, to control the power supply system. The motor controller 43 controls the motor generators MG1 and MG2 via an inverter 45, according to the required values which are output from the hybrid controller 44 and which are required for driving the motor generators MG1 and MG2.

The motor shaft 10 of the motor generator MG1 is rotatably fitted to the case 25 for the transaxle through a ball bearing 26. The ring gear 3R of the transfer gearbox 2 is rotatably fitted to annular support portions (support portions) 25a and 25b of the case 25 respectively through ball bearings 27 and 28.

The motor shaft 10 is formed as a hollow shaft. An end of the motor shaft 10 is spline-fitted to an end of the input shaft 6. One end of an oil pump drive shaft 29 is fitted to the end of the input shaft 6 and the other end of the oil pump drive shaft 29 is coupled to the oil pump 7. That is, the oil pump drive shaft 29 has a function of transmitting the power of the input shaft 6 to the oil pump 7 to drive the oil pump 7 so that the oil pump 7 discharges oil.

An internal communication hole 29a is formed inside the oil pump drive shaft 29. The communication hole 29a extends in the axial direction of the oil pump drive shaft 29. The oil discharged from the oil pump 7 is supplied through the communication hole 29a to the one end of the oil pump drive shaft 29 from the other end of the oil pump drive shaft 29.

An internal communication hole 6 is formed inside the input shaft 6. The communication hole 6a extends in the axial direction of the input shaft 6. The communication hole 6a communicates with the communication hole 29 in the oil pump drive shaft 29a. In addition, a radial hole 6b is formed in the input shaft 6. The radial hole 6b communicates with the communication hole 6a and extends from the communication hole 6a in the radial direction of the input shaft 6.

Each of the pinion gears 3P is rotatably coupled to a pinion shaft 3PS of the carrier 3C through a needle bearing 30. A communication hole 3a and a radial hole 3b are formed in the pinion shaft 3PS. The communication hole 3a extends in the axial direction of the pinion shaft 3PS. The radial hole 3b extends from the communication hole 3a in the radial direction of the pinion shaft 3PS.

According to the first embodiment of the present invention, oil is supplied from the oil pump 7 to the communication hole 29a in the oil pump drive shaft 29 and to the communication hole 6a in the input shaft 6. Then, the oil is supplied from the from the radial hole 6b to the transfer gearbox 2 by the centrifugal force generated by the rotations of the input shaft 6

Part of the oil, which is scattered from the radial hole 6b outwardly in the radial direction of the input shaft 6, is introduced into the communication hole 3a in the pinion shaft 3PS from an open end of the communication hole 3a. Then, the part of the oil is supplied from the radial hole 3b to the needle bearing 30 by the centrifugal force generated by the rotations of the pinion shaft 3PS, thus to lubricate the needle bearing 30.

The rest of the oil, which is supplied for the transfer gearbox 2, is supplied to a meshing portion 32 between inner teeth of the ring gear 3R and outer teeth of one of the pinion gear 3P, thus to lubricate the ring gear 3R and the pinion gears 3P. Further, as the pinion gears 3P rotate, the oil is also supplied to a meshing portion between the outer teeth of the pinion gear 3P and outer teeth of the sun gear 3S, thus to lubricate the meshing portion between the outer teeth of the pinion gear 3P and outer teeth of the sun gear 3S.

The Ball bearings 27 and 28 include: outer races (outer ring members) 27a and 28a; and inner races (inner ring members) 27c and 28c, respectively. The outer races 27a and 28a are fitted to the inner periphery of the ring gear 3R. The inner races 27c and 28c are provided on outer peripheries of the annular support portions 25a and 25b of the case 25, respectively. Also, the inner races 27c and 28c are rotatably fitted to the outer races 27a and 28a respectively through ball portions (rolling elements) 27b and 28b. The ball bearings 27 and 28 are provided apart from each other in the axial direction of the input shaft 6 with the carrier 3C between the ball bearings 27 and 28.

The outer races 27a and 28a of the ball bearings 27 and 28 have inner peripheries 27i and 28i, respectively. The inner peripheries 27i and 28i are positioned more inward in the radial direction of the ring gear 3R, relative to the meshing portion 32 between the inner teeth of the ring gear 3R and the outer teeth of the pinion gear 3P. At the bottom of the ring gear 3R, an oil reservoir 33 that stores oil (O) is defined by the inner periphery of the ring gear 3R and the outer races 27a and 28a of the ball bearings 27 and 28.

Thus, the oil, which is scattered from the radial hole 6b to the transfer gearbox 2, is introduced into the communication hole 3a in the pinion shaft 3PS from the open end of the communication hole 3a. Then, the oil is supplied from the radial hole 3b to the needle bearing 30 by the centrifugal force generated by the rotations of the pinion shaft 3PS, thus to lubricate the needle bearing 30.

The oil is supplied to the meshing portion 32 between the inner teeth of the ring gear 3R and the outer teeth of the pinion gear 3P, thus to lubricate the ring gear 3R and the pinion gear 3P. Further, as the pinion gear 3P rotate, the oil is supplied to the meshing portion between the outer teeth of the pinion gear 3P and the outer teeth of the sun gear 3S, thus to lubricate the meshing portion between the outer teeth of the pinion gear 3P and the outer teeth of the sun gear 3S.

When the transfer gearbox 2 is lubricated, the oil is supplied to the inner periphery of the ring gear 3R and is then stored in the oil reservoir 33. An oil seal 54 is provided between the input shaft 6 and the case 25. The input shaft 6 is rotatably supported by the case 25 and the motor shaft 10 through needle bearings 55 and 56.

The engine 1 produces high output power and allows the vehicle to travel a long distance. The engine 1 operates more efficiently when a engine load is high, while the engine operates less efficiently when the engine load is low, such as when the vehicle travels at a low speed. On the other hand, the motor generator MG2 produces a high low-speed torque, and is thus suitable for traveling in urban areas, in which the vehicle is often restarted or the vehicle often travels in a low speed. However, the travel distance by the motor generator MG2 is short.

The hybrid vehicle according to the first embodiment of the present invention takes advantage of these characteristics and selectively uses the engine 1 and the motor generator MG2 depending on the traveling conditions, so that the hybrid vehicle can exploit the advantages of the engine 1 and the motor generator MG2 and compensate for their disadvantages. This allows the hybrid vehicle to provide smoother, more responsive vehicle performance and improved fuel economy.

For example, at startup or during low-speed traveling, the engine 1 is stopped and the battery 41 supplies electrical power to drive the motor generator MG2, in order to allow the hybrid vehicle to travel in a motor drive mode (EV drive mode). Thus, the hybrid controller 44 activates a relay 46 connected to the battery 41 to supply direct current (DC) high-voltage electrical power to the inverter 45.

The inverter 45 includes a three-phase bridge circuit in which six power transistors are provided for each of the motor generators MG1 and MG2. The inverter 45 performs conversion between the DC and three-phase AC.

The motor controller 43 controls the power transistors. The inverter 45 transmits to the motor controller 43 information required for current control, such as a value of output current.

The inverter 45 adjusts amplitude and frequency of the three-phase AC to values required for adjusting an output torque and a rotational speed of the motor generator MG2 to desirable values. The inverter 45 then supplies the three-phase AC with the adjusted amplitude and frequency to the motor generator MG2.

During normal traveling, the engine 1 is driven to transmit part of the output of the engine 1 to the drive wheels 24, and to utilize part of the output for electrical power generation. Then, the electrical power generated in the motor generator MG1 is used to drive the motor generator MG2 to allow the vehicle to travel in a hybrid drive mode (HV drive mode).

More specifically, when the rotational torque, which is generated by the rotationally driving the engine 1, is transmitted to the input shaft 6 through the crankshaft 4 of the engine 1 and the transaxle damper 5, the carrier 3C rotates together with the input shaft 6. Accordingly, the pinion gears 3P rotate and revolve around the sun gear 3S. This allows the power to be transmitted from the ring gear 3R to the first counter driven gear 15.

The first counter driven gear 15 transmits the power to the differential drive pinion 18 through the second driven gear 17. The differential drive pinion 18 transmits the power to the differential 22 through a differential ring gear 20. Then, the differential 22 transmits a differential output to the drive wheels 24 through the drive shaft 23.

On the other hand, rotations of the pinion gears 3P are transmitted to the sun gear 3S, thus to rotate the rotor 9R of the motor generator MG1 through the motor shaft 10. As a result, the motor generator MG1 generates electrical power.

At this time, the power is transmitted from the input shaft 6 to the oil pump 7 thorough the oil pump drive shaft 29. Thus, oil is supplied from the oil pump 7 through the communication hole 29a in the oil pump drive shaft 29 to the communication hole 6a in the input shaft 6. Then, the oil is supplied from the radial hole 6b to the transfer gearbox 2 by the centrifugal force generated by the rotation of the input shaft 6, thus to lubricate the components of the transfer gearbox 2.

During high-engine load traveling, such as hill-climbing and full-throttle acceleration, electrical power is also supplied from the battery 41 to drive the motor generator MG2, in addition to using the electrical power of the motor generator MG1 to drive the motor generator MG2 during the normal driving, as described above. This increases the output torque of the motor generator MG2 to assist the engine output.

The output torque of the motor generator MG2 is adjusted by adjusting a current value of the three-phase AC supplied to the motor generator MG2.

In addition, during deceleration driving or during braking, the kinetic energy of the vehicle is provided to the motor generator MG2 through the gear train, and is converted into electrical energy. Here, the motor generator MG2 functions as a generator.

The electrical energy generated by the motor generator MG2 is charged to the battery 41. Further, the engine 1 is stopped automatically.

When the dive mode of the vehicle is the EV drive mode, the vehicle travels with the engine 1 stopped. Thus, in the EV drive mode, the oil pump 7 is not be activated by using output from the engine 1.

The carrier 3C of the transfer gearbox 2, which is coupled to the input shaft 6, does not rotate. Accordingly, the pinion gears 3P rotate due to a reaction force received by the ring gear 3R through the gear train 14 from the motor generator MG2 and the drive wheels 24.

If no lubricant is kept supplied to the transfer gearbox 2 for a certain period of time, seizure or wearing of the gears and other components may occur. According to the first embodiment of the present invention, the outer races 27a and 28a are provided apart from each other in the axial direction of the input shaft 6 with the carrier 3C between the outer races 27a and 28a, and the inner peripheries 27i and 28i of the outer races 27a and 28a are positioned more inward in the radial direction of the ring gear 3R, relative to the meshing portion 32 between the inner teeth of the ring gear 3R and the outer teeth of the pinion gear 3P. Thus, at the bottom of the ring gear 3R, the oil reservoir 33 that stores oil (O) is defined by the inner periphery of the ring gear 3R and the outer races 27a and 28a of the ball bearings 27 and 28.

Figure 3:
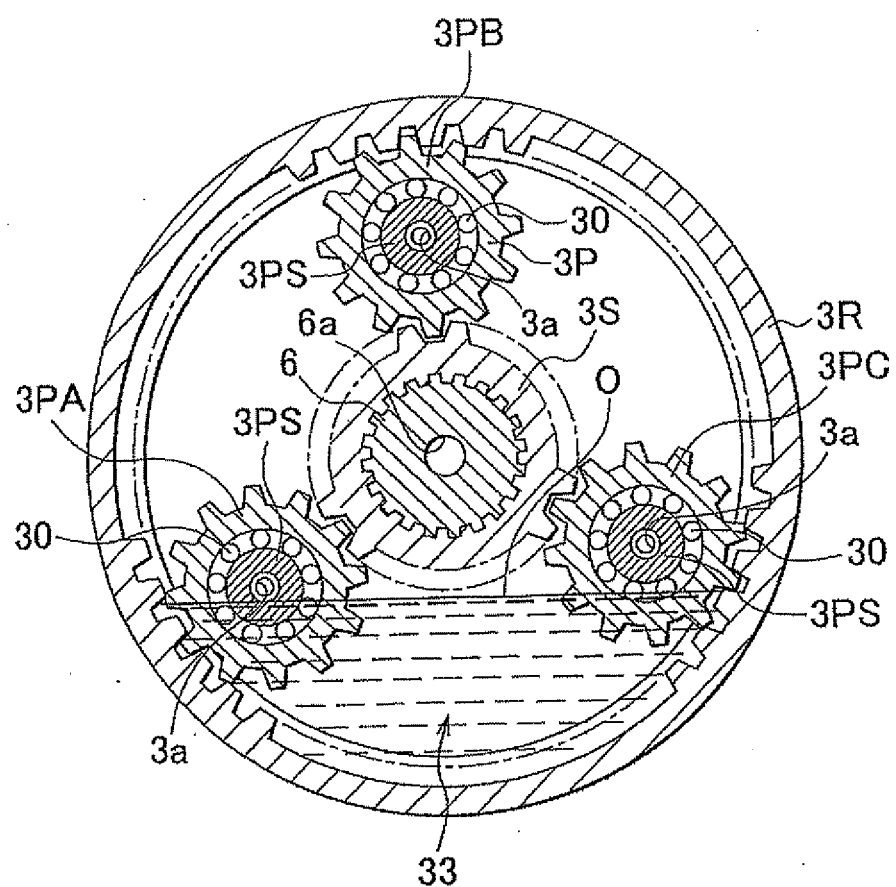
FIG. 3 is a sectional view of a planetary gear mechanism or the transfer gearbox, in which some of pinion gears of the planetary gear mechanism are partly immersed in oil, according to the first embodiment of the hybrid drive apparatus and the controller for the hybrid drive apparatus of the present invention.

Therefore, as illustrated in FIG. 3, the oil reservoir 33 allows some of the plural pinion gears 3P, for example, the two pinion gears 3P, to be immersed in the oil (O) stored in the oil reservoir 33. It should be noted that in FIG. 3, the plural pinion gears 3P are denoted by 3PA, 3PB and 3PC, respectively.

The pinion gear 3PA is immersed in the oil (O) with the oil level reaching the pinion shaft 3PS. In the pinion gear 3PA, the oil is introduced into the communication hole 3a from the open end of the communication hole 3a. Then, the oil is supplied from the radial hole 3b to the needle bearing 30 by the centrifugal force generated by the rotations of the pinion shaft 3PS, thus to lubricate the needle bearing 30.

The pinion gears 3PA and 3PC are immersed in the oil (O). This allows the meshing portion 32 between the inner teeth of the ring gear 3R and the outer teeth of the pinion gears 3PA and 3PC to be lubricated. In addition, as the pinion gears 3P rotate, the oil is also supplied to the meshing portion between the outer teeth of the pinion gears 3PA and 3PC and the outer teeth of the sun gear 3S. This allows the meshing portion between the outer teeth of the pinion gears 3PA and 3PC and the outer teeth of the sun gear 3S to be lubricated.

As illustrated by the example in FIG. 3, the two pinion gears 3PA and 3PC are immersed in the oil (O) in the oil reservoir 33, while the other pinion gear 3PB positioned above the two pinion gears 3PA and 3PC is not immersed in the oil (O) in the oil reservoir 33. Accordingly, the needle bearing 30 of the pinion gear 3PB may not be lubricated.

Therefore, instead of the engine 1, the motor generator MG1 is driven as an alternative drive power source for the oil pump 7 to control the input shaft 6 coupled to the carrier 3C so as to rotate by a predetermined rotational angle. This allows the pinion gear 3PB that is not immersed in the oil (O) to be immersed in the oil (O).

In FIG. 1, the hybrid controller 44 mainly configured by a microcomputer. The microcomputer includes a Central Processing Unit (CPU) 44a and a recording unit. The recording unit includes a Read Only Memory (ROM) 44b and Random Access Memory (RAM) 44c.

A crank angle sensor 47 is connected to the hybrid controller 44. The crank angle sensor 47 detects a rotation of the crank shaft 4. The hybrid controller 44 detects a position of the crankshaft 4, i.e., a position of the input shaft 6 based on information detected by the crank angle sensor 47.

In addition, a rotational speed sensor 48 is connected to the hybrid controller 44. The rotational speed sensor 48 detects a rotational speed of the motor shaft 10 of the motor generator MG2 and outputs information the detected rotational speed to the hybrid controller 44. The hybrid controller 44 includes a timer 49.

Further, the hybrid controller 44 further includes a register 52. In the register 52, a flag is set corresponding to the drive mode of the vehicle. The hybrid controller 44 determines whether the drive mode of the vehicle is changed to the EV drive mode based on the information detected by the accelerator operation amount sensor 50 and the vehicle speed sensor 51. If the hybrid controller 44 determines that the drive mode of the vehicle is changed to the EV drive mode, the hybrid controller 44 sets a flag "1" in the register 52. If the drive mode of the vehicle is changed to an engine operating drive mode, the hybrid controller 44 sets a flag "0" in the register 52. According to the first embodiment of the present invention, the hybrid controller 44 serves as a drive mode determining unit.

When the rotational driving of the engine 1 is stopped and the drive mode is changed to the EV drive mode, the hybrid controller 44 calculates a rotational speed of the ring gear 3R, which receives the reaction force from the motor generator MG2 based on information on a time duration measured by the timer 49 and the information detected by the rotational speed sensor 48. Subsequently, the hybrid controller 44 calculates a rotational speed of the sun gear 3S, i.e., a rotational torque and a rotational speed of the motor generator MG1, by which the input shaft 6 is rotated through the carrier 3C by a predetermined rotational angle.

Then, the hybrid controller 44 outputs to the motor controller 43 a control signal for rotating the input shaft 6 by a predetermined rotational angle. The motor controller 43 drives the motor generator MG1 based on the control signal to rotate the input shaft 6 through the carrier 3C. According to the first embodiment of the present invention, the motor controller 43 and the hybrid controller 44 serves as an electric motor controlling unit.

Figure 5:
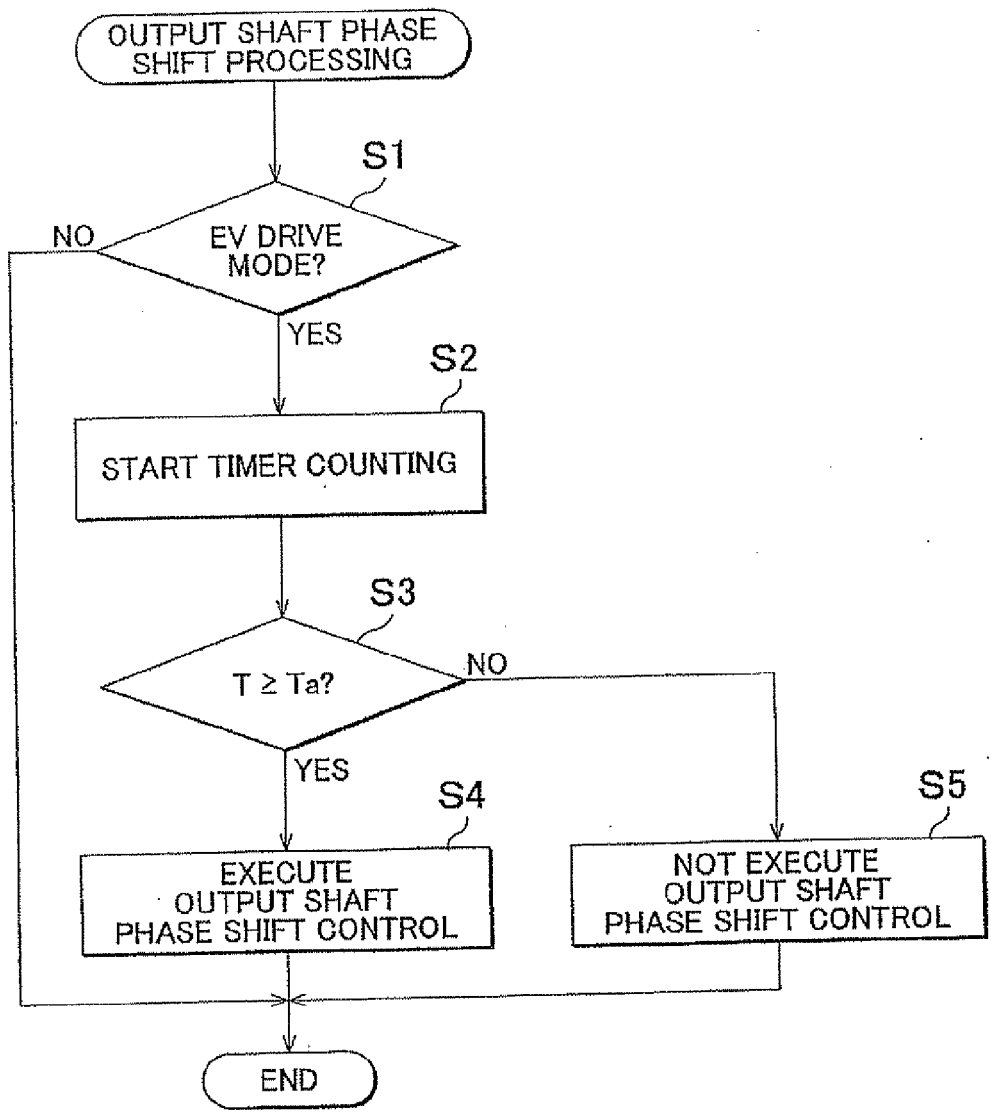
FIG. 5 is a flowchart that illustrates processing for the output shaft phase shift control according to the first embodiment of the hybrid drive apparatus and the controller for the hybrid drive apparatus of the present invention.

Next, processing for the output shaft phase shift control will be described later with reference to a flowchart illustrated in FIG. 5. The flowchart in FIG. 5 is defined in an output shaft phase shift control program stored in the ROM 44b of the hybrid controller 44. The CPU 44a executes the output shaft phase shift control program.

The CPU 44a of the hybrid controller 44 determines whether the vehicle drive mode is the EV drive mode based on the flag that is set in the register 52 (step S1). If the flag "0" is set in the register 52, the CPU 44a determines that the drive mode of the vehicle is not the EV drive mode, and discontinues the current processing. On the other hand, if the flag "1" is set in the register 52, the CPU 44a determines that the drive mode of the vehicle is changed to the EV drive mode, and turns the timer 49 ON to start measuring a time duration (step S2).

In the step S1, the CPU 44a determines that the drive mode of the vehicle is changed to the EV drive mode, if the operating condition of the engine 1 is fall within a low engine-torque range or within a low vehicle-speed range, based on the information detected by the accelerator operation amount sensor 50 and the vehicle speed sensor 51. Then, the CPU 44a sets the flag "1" in the register 52 and transmits to the ECU 42 a signal for stopping the engine 1 to allow the drive mode of the vehicle is changed to the EV drive mode.

In the EV drive mode, the CPU 44a transmits to the motor controller 43 a signal for driving the motor generator MG2. The motor controller 43 activates the relay 46 to supply DC high-voltage electrical power to the inverter 45. The inverter 45 adjusts the amplitude and frequency of the three-phase AC to values required for adjusting the output torque and rotational speed of the motor generator MG2 to desirable values. The inverter 45 then supplies the three-phase AC with the adjusted amplitude and frequency to the motor generator MG2. In this manner, the vehicle travels in the EV drive mode.

Next, the CPU 44a determines whether a time duration T measured by the timer 49 (an elapsed time since the driving mode of the vehicle is changed to the EV drive mode) is equal to or exceeds a predetermined time duration Ta (step S3). The predetermined time duration Ta is set to a duration for which the vehicle can travel without supplying oil to the transfer gearbox 2 (an allowable traveling duration without lubrication), for example. The allowable traveling duration without lubrication may be obtained by an experiment which determines how long the vehicle can travel without supplying oil to the transfer gearbox 2. In addition, the allowable traveling duration without lubrication has a safety margin prohibiting the gear elements in the planetary gear mechanism from suffering burnout.

If the CPU 44a determines that the time duration T measured by the timer 49 is not equal to or does not exceed the predetermined time duration Ta in the step S3, the CPU 44a maintains the current phase of the input shaft 6 (step S5). On the other hand, if the CPU 44a determines that the time duration T measured by the timer 49 is equal to or exceeds the predetermined time duration Ta in the step S3, the CPU 44a executes the output shaft phase shift control (step S4), and then completes the current processing.

Under the output shaft phase shift control, the CPU 44a predetermines the rotational angle (phase) of the input shaft 6 at a value that allows the upper pinion gear 3PB of the three pinion gears 3PA, 3PB, 3PC to be immersed in the oil (O), for example, at 130°. In addition, the CPU 44a calculates the rotational speed of the ring gear 3R, which receives the reaction force from the motor generator MG2, based on the information detected by the rotational speed sensor 48.

In the EV drive mode, the carrier 3C does not rotate, but the pinion gears 3P rotate in response to the reaction force received by the ring gear 3R. Thus, the CPU 44a calculates the rotational speed of the sun gear 3S with respect to the rotational speed of the ring gear 3R in order to allow the input shaft 6 to rotate by 130° through the carrier 3C.

Then, the CPU 44a transmits to the motor controller 43 a signal for driving the motor generator MG1. The motor controller 43 activates the relay 53 to supply DC high-voltage electrical power to the inverter 45. The inverter 45 adjusts the amplitude and frequency of the three-phase AC to values required for adjusting the output torque and rotational speed of the motor generator MG1 to desirable values. The inverter 45 then supplies the three-phase AC with the adjusted amplitude and frequency to the motor generator MG1.

When the CPU 44a determines that the input shaft 6 rotates by 130° through the carrier 3C by driving the motor generator MG1 based on the information detected by the crank angle sensor 47, the CPU 44a outputs a motor stop signal to the motor controller 43. The motor controller 43 stops the motor generator MG1.

Figure 4:
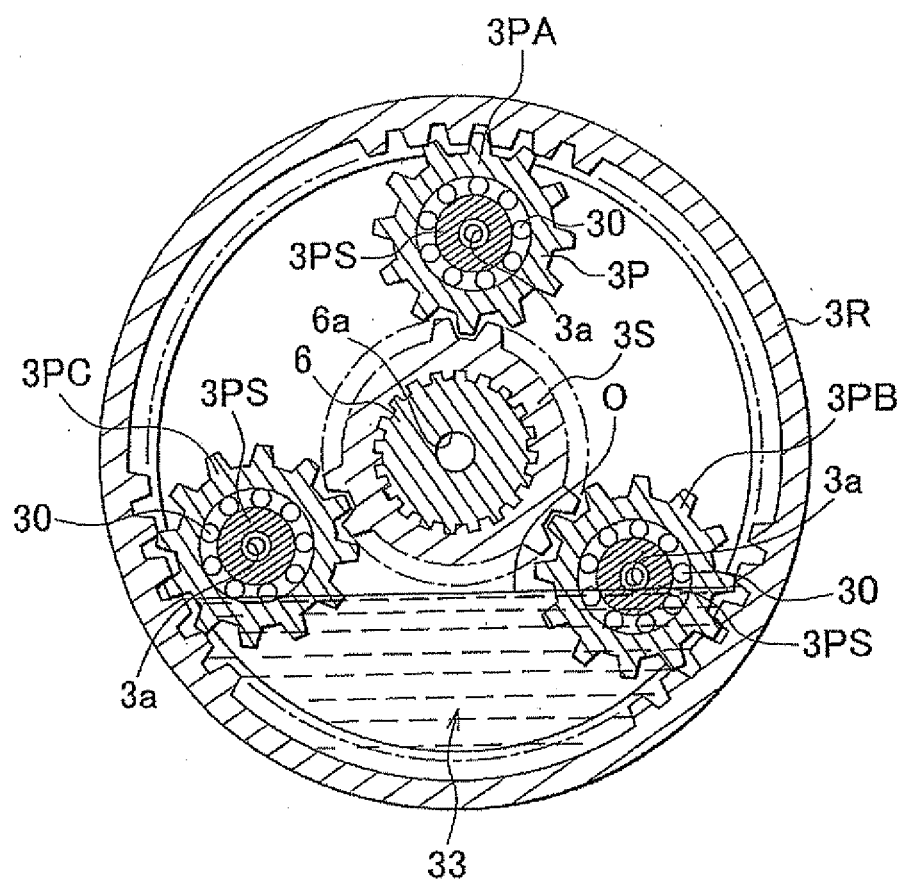
FIG. 4 is a sectional view of the planetary gear mechanism or the transfer gearbox, in which some of the pinion gears are partly immersed in the oil after an output shaft phase shift control is executed, according to the first embodiment of the hybrid drive apparatus and the controller for the hybrid drive apparatus of the present invention.

In this manner, the pinion gears 3PB and 3PC is immersed in the oil (O) by rotating the input shaft 6 by 130°, as illustrated in FIG. 4. Therefore, the needle bearing 30 of the pinion gear 3PB is lubricated with oil that flows through the communication hole 6a and the radial hole 6b of the pinion gear 3PB. At the same time, the meshing portion 32 between the outer teeth of the pinion gear 3PB and the inner teeth of the ring gear 3R is also lubricated.

As described above, according to the first embodiment of the present invention, a specific condition is defined as follows: the elapsed time since the drive mode of the vehicle is changed to the EV drive mode is equal to or exceeds the predetermined time duration. This elapsed time indicates a rotation state of the pinion gears 3P. If the CPU 44a determines that the specific condition is satisfied, the motor generator MG1 is driven to rotate the input shaft 6 by the predetermined rotational angle.

However, because it is difficult to determine at which position the pinion gears 3P are when the engine 1 is stopped, not all the pinion gears 3P may be immersed in the oil (O) when the input shaft 6 rotates by the predetermined rotational angle.

Thus, in the step S3, the time duration may be set to a value about one-third of the allowable driving duration without lubrication and the rotational torque and the rotational speed of the motor generator MG2 may be set to values that allow the input shaft 6 to rotate by a randomly determined angle every time the predetermined time duration elapses, for example by 130°, 200°, and 90°. In other words, an angle by which the input shaft 6 rotate may be changed randomly every time the predetermined time duration elapses.

This allows all the pinion gears 3PA, 3PB, and 3PC to be immersed in the oil (O) to be lubricated when the vehicle travels in the EV drive mode.

As described above, according to the first embodiment of the present invention, the ball bearings 27 and 28 are fitted respectively to the annular support portions 25a and 25b of the case 25 in such a manner that the inner peripheries 27i and 28i of the outer races 27a and 28a of the ball bearings 27 and 28 are positioned more inward in the radial direction of the ring gear 3R, relative to the meshing portion 32 between the inner teeth of the ring gear 3R and the outer teeth of the pinion gear 3P. Thus, at the bottom of the ting gear 3R, the oil reservoir 33 is defined by the inner periphery of the ring gear 3R and a pair of the outer races 27a and 28a. This allows the pinion gears 3P to be immersed in the oil (O).

When the vehicle travels in the EV drive mode in which the engine 1 is stopped, the carrier 3C does not rotate. Consequently, at least one of the pinion gears 3P may not immersed in the oil. However, according to the first embodiment of the present invention, when the predetermined time duration elapses since the drive mode of the vehicle is changed to the EV drive mode, the motor generator MG1 is driven to rotate the input shaft 6 by the predetermined rotational angle. This allows all the pinion gears 3P to be immersed in the lubricant.

Therefore, when the vehicle travels in the motor drive mode in which the rotational driving of the engine 1 is stopped, no lubricant needs to be supplied from the oil pump 7 to the transfer gearbox 2. Thus, unlike the conventional hybrid drive apparatuses, the motor generator MG1 needs not to be driven to rotate the input shaft 6 at a rotational speed at which the oil pump 7 can supply lubricant to the transfer gearbox 2. This prevents excessive battery consumption, while allowing the transfer gearbox 2 to be lubricated.

According to the first embodiment of the present invention, the specific condition is defined as follows: the pinion gears 3P rotate for the predetermined time duration after the drive mode of the vehicle is changed to the EV drive mode (the predetermined time duration elapses since the drive mode of the vehicle is changed to the EV drive mode). However, it should be understood that the present invention may also employ another specific condition defined as follows: a distance that the vehicle has travelled reaches a predetermined distance. In this case, the hybrid controller 44 may calculate the distance that the vehicle has travelled by time-integrating the vehicle speed detected by the vehicle speed sensor 51. Then, when the distance that the vehicle has travelled reaches the predetermined distance (for example, an allowable traveling distance without lubrication), the hybrid controller 44 may rotate the input shaft 6 by the predetermined rotational angle.

In addition, according to the first embodiment of the present invention, when the vehicle travels in the EV drive mode, the hybrid controller 44 allows the input shaft 6 to rotate by the predetermined rotational angle smaller than 360°. However, it should be understood that the hybrid controller 44 may rotate the input shaft 6 by a rotational angle equal to or larger than 360°. In this case, the hybrid controller 44 may rotate the input shaft 6 in such a manner that allows the communication hole 3a in the pinion gear 3P to be filled sufficiently with the oil (O). This allows more reliable lubrication of the needle bearing 30 with the oil (O) flowing through the communication hole 3a and the radial hole 3b of each of the pinion gears 3P.

Furthermore, according to the first embodiment of the present invention, the specific condition is defined as follows: the pinion gears 3P rotate for the predetermined time duration after the drive mode of the vehicle is changed to the EV drive mode. However, it should be understood that the present invention may also employ another specific condition defined as follows: the motor generator MG2 regenerates electrical energy when the drive mode of the vehicle is changed to the EV drive mode.

Figure 6:
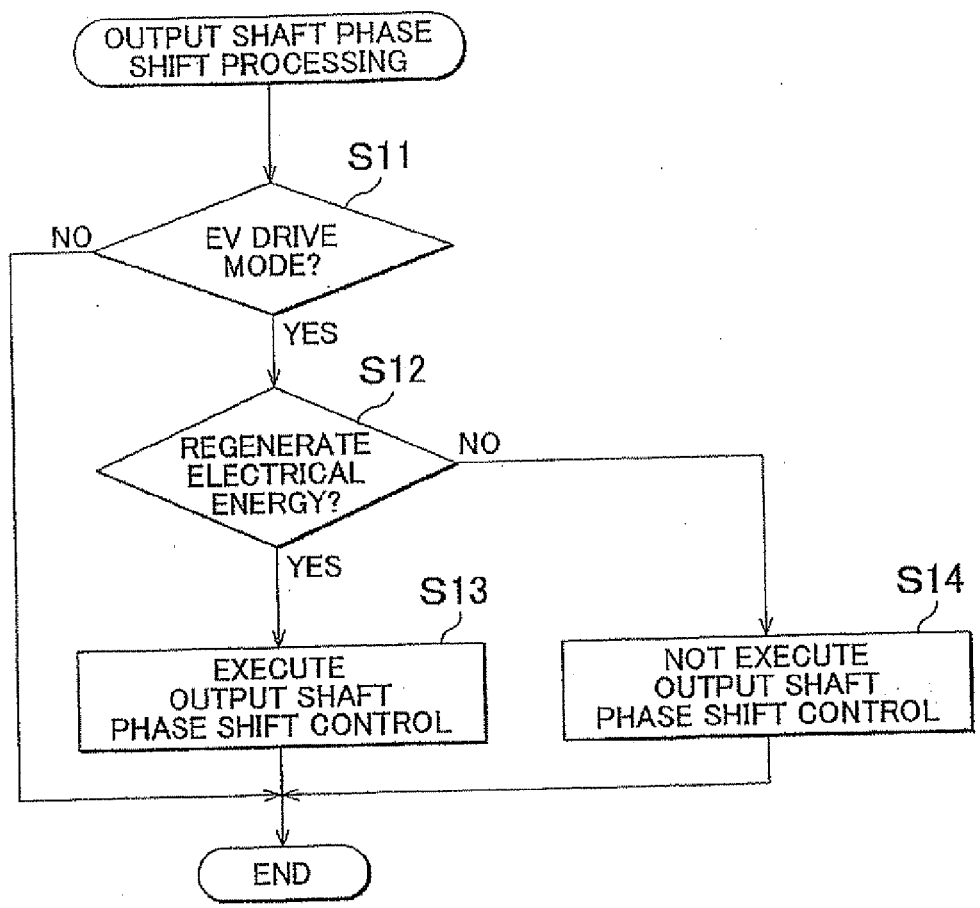
FIG. 6 is a flowchart that illustrates another processing for the output shaft phase shift control according to the first embodiment of the hybrid drive apparatus and the controller for the hybrid drive apparatus of the present invention.

In this case, as illustrated in FIG. 6, after the CPU 44a in the hybrid controller 44 determines that the drive mode of the vehicle is the EV drive mode in the step 11, the CPU 44a in the hybrid controller 44 determines whether the motor generator MG2 regenerates electrical energy in the step S12. More specifically, the CPU 44a determines whether the vehicle is decelerating based on the information detected by the accelerator operation amount sensor 50 and the vehicle speed sensor 51, and whether the vehicle is braking with a brake pedal depressed based on detected information from a brake pedal switch (not illustrated). If the CPU 44a determines that the vehicle is not decelerating or braking, the CPU 44a goes to the step S14 to maintain the current phase of the input shaft 6.

On the other hand, if the CPU 44a determines that the vehicle is decelerating or braking, the CPU 44a determines that the motor generator MG2 regenerates electrical energy by the regenerative braking on the drive wheels 24, and then goes to the step S13 to execute the output shaft phase shift control.

This allows the meshing portion of the pinion gear 3P, which has not yet been immersed in the oil (O), to be immersed in the oil (O) during the regeneration of the electric energy, thus to lubricate the transfer gearbox 2 when the engine 1 is stopped.

In addition, the input shaft 6 of the engine 1 only needs to rotate by the predetermined rotational angle during the deceleration. This prevents noise and vibration (NV) from occurring in the engine 1, and inhibits the driver from feeling uncomfortable.

Second Embodiment

Figure 7:
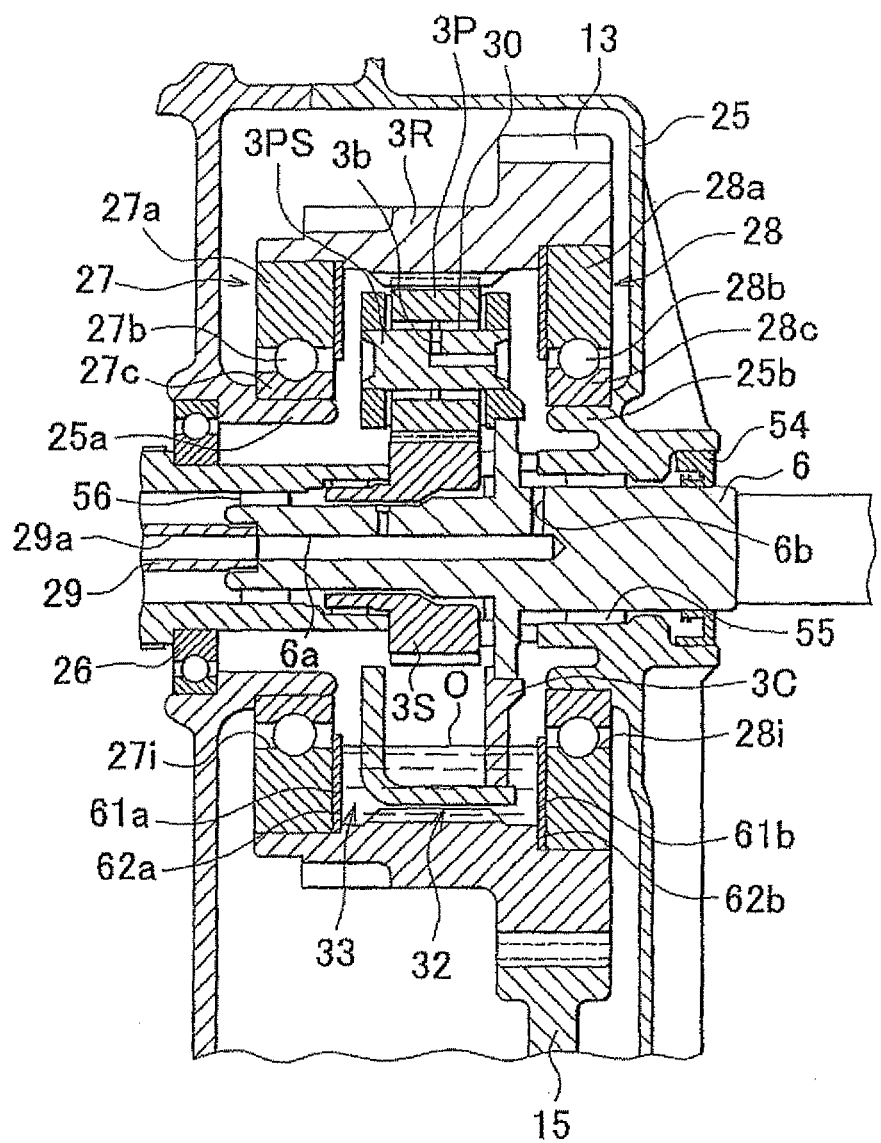
FIG. 7 is a sectional view of the transfer gearbox according to a second embodiment of the hybrid drive apparatus and the controller for the hybrid drive apparatus of the present invention.

FIG. 7 illustrates the hybrid drive apparatus and the controller for the hybrid drive apparatus according to a second embodiment of the present invention. In the following description, like numerals denote like elements among the first and second embodiments, and the description of the like elements is not repeated.

In FIG. 7, annular members 61a and 61b are provided respectively between the ring gear 3R and the outer race 27a of the ball bearing 27 and between the ring gear 3R and the outer race 28a of the ball bearing 28. The annular members 61a and 61b have their respective ends on outerside in the radial direction (radially outer ends). The radially outer ends are pressed into gaps respectively between the outer race 27a and an inner peripheral step portion 62a of the ring gear 3R and between the outer race 28a and an inner peripheral step portion 62b of the ring gear 3R.

The annular members 61a and 61b are designed respectively to cover a part of a gap between the outer race 27a and the inner race 27c and to cover a part of a gap between the outer race 28a and the inner race 28c. The annular members 61a and 61b have their respective ends on inner side in the radial direction (radially inner ends). The radially inner ends are positioned more inward in the radial direction of the ring gear 3R, relative to the inner peripheries 27i and 28i of the outer races 27a and 28a.

According to the second embodiment of the present invention, the annular members 61a and 61b are provided respectively to cover a part of the gap between the outer race 27a and the inner race 27c and to cover a part of the gap between the outer race 28a and the inner race 28c. The annular members 61a and 61b help to reduce an amount of oil to flow from the oil reservoir 33 through the gap between the outer race 27a and the inner race 27c and the gap between the outer race 28a and the inner race 28c into the ball portions 27b and 28b. This results in a reduction in oil stirring resistance of the ball portions 27b and 28b, and thus results in a reduction in loss of driving power of the transfer gearbox 2. It should be understood that the annular members 61a and 61b may also be designed respectively to cover the entire gap between the outer race 27a and the inner race 27c and to cover the entire gap between the outer race 28a and the inner race 28c.

Third Embodiment

Figure 8:
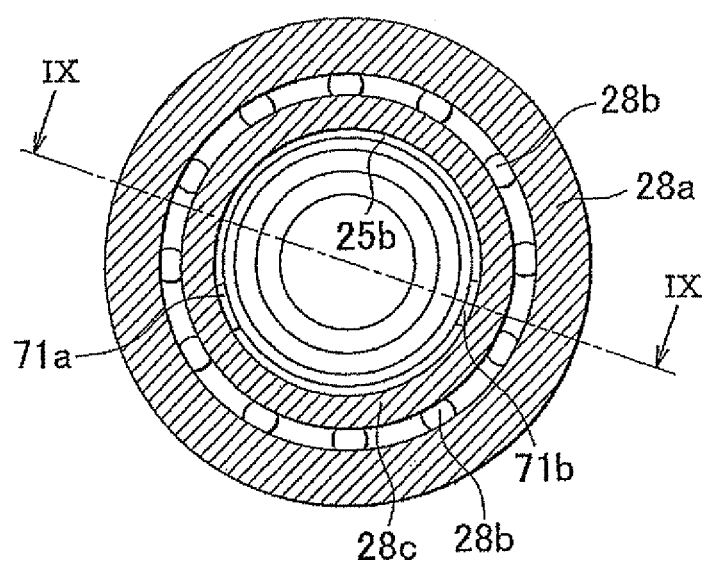
FIG. 8 is a sectional view that illustrates an essential part of a case and a bearing according to a third embodiment of the hybrid drive apparatus and the controller for the hybrid drive apparatus of the present invention.
Figure 9:
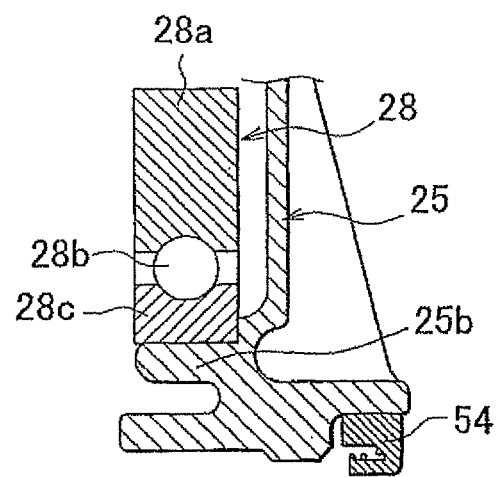
FIG. 9 is a sectional view taken along the line IX-IX of FIG. 8.
Figure 9:
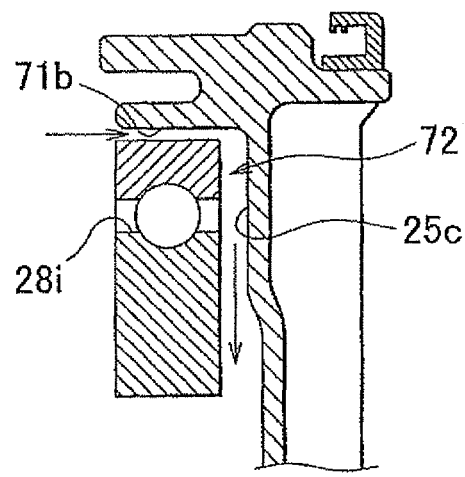

FIG. 8 and FIG. 9 illustrate the hybrid drive apparatus and the controller for the hybrid drive apparatus according to a third embodiment of the present invention. In the following description, like numerals denote like elements among the first to third embodiments, and the description of the like elements is not repeated.

In FIG. 8 and FIG. 9, plural discharge holes 71a and 71b are formed between the annular support portion 25b of the case 25 and the inner race 28c of the ball bearing 28. The discharge holes 71a and 71b are designed to discharge part of the oil flowing from the oil reservoir 33. The discharge holes 71a and 71b each are a slot formed on a part of a circumference of the annular support portion 25b.

The ball bearing 28 has one end in the axial direction (one radial end). The case 25 has a wall surface 25c. Between the one axial end and the wall surface 25c, an oil discharge passage 72 is formed to communicate with the discharge hole 71b (an oil discharge passage that communicates with the discharge hole 71a is not illustrated in FIG. 9). The discharge holes 71a and 71b are positioned above the oil reservoir 33. When the rotational driving of the engine 1 is stopped, part of the oil stored in the oil reservoir 33 is discharged from the discharge holes 71a and 71b through the oil discharge passages 72. Thus, the oil level is maintained constant in the oil reservoir 33.

As described above, according to the third embodiment of the present invention, the discharge holes 71a and 71b are formed between the annular support portion 25b of the case 25 and the inner race 28c of the ball bearing 28 to discharge the oil stored in the oil reservoir 33. This prevents an excess amount of oil from being stored in the oil reservoir 33, while preventing an increase in oil stirring resistance of the ring gear 3R or the pinion gears 3P, both of which form the transfer gearbox 2.

In addition, the discharge holes 71a and 71b are positioned above the oil reservoir 33. This prevents the oil stored in the oil reservoir 33 from being completely discharged from the discharge holes 71a and 71b, and therefore allows more reliable lubrication of the transfer gearbox 2.

Fourth Embodiment

Figure 10:
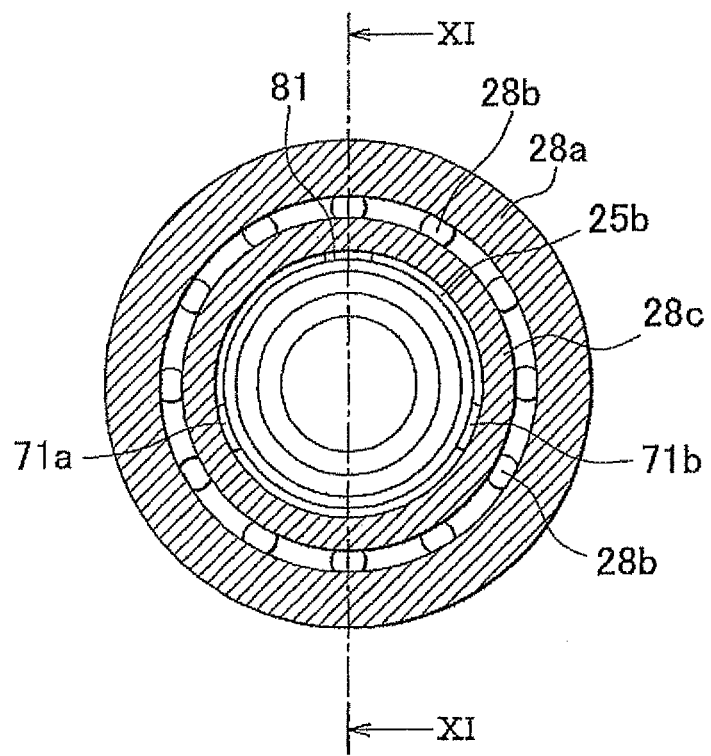
FIG. 10 is a sectional view of the transfer gearbox according to a fourth embodiment of the hybrid drive apparatus and the controller for the hybrid drive apparatus of the present invention.
Figure 11:
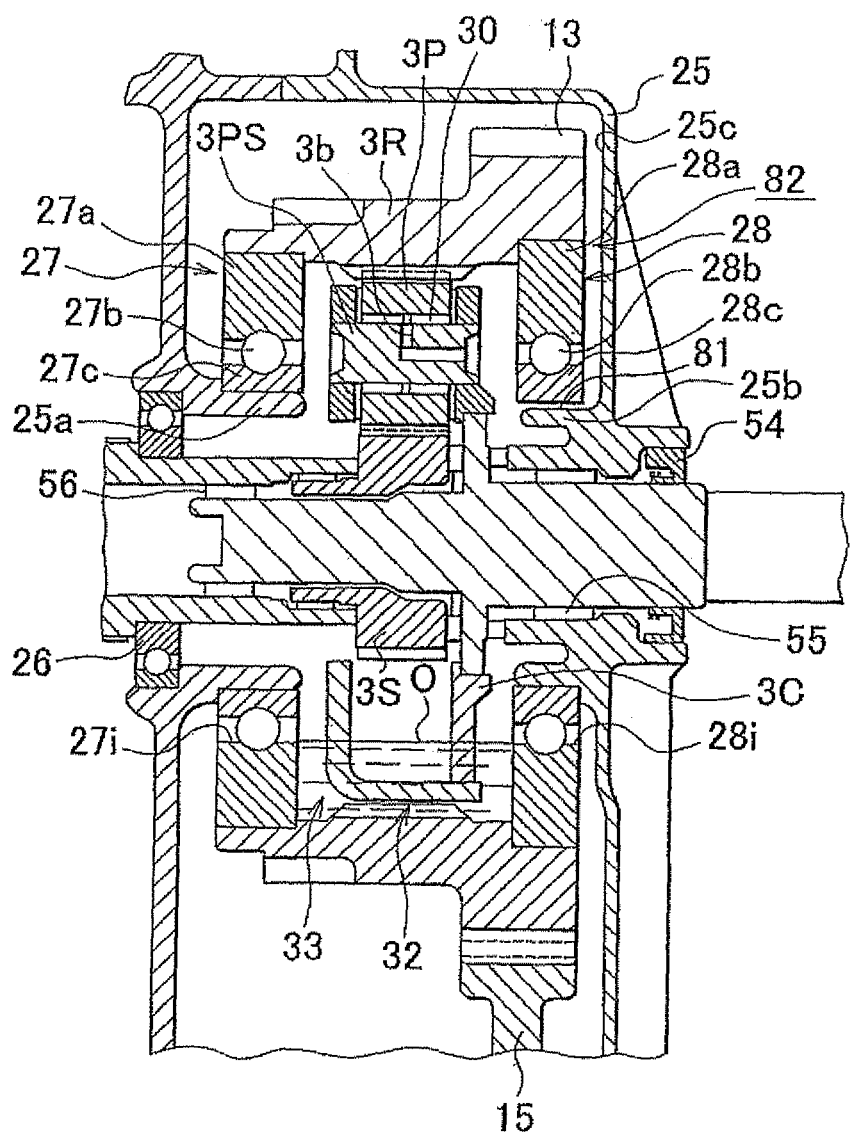
FIG. 11 is a sectional view taken along the line XI-XI of FIG. 10.

FIG. 10 and FIG. 11 illustrate the hybrid drive apparatus and the controller for the hybrid drive apparatus according to a fourth embodiment of the present invention. In the following description, like numerals denote like elements among the first to fourth embodiments, and the description of the like elements is not repeated.

As illustrated in FIG. 10 and FIG. 11, the transaxle according to the fourth embodiment of the present invention neither has the oil pump 7 nor the oil pump drive shaft 29. In addition, the input shaft 6 is formed neither with the communication hole 6a nor with the radial hole 6b.

An inflow hole 81 is formed between the annular support portion 25b of the case 25 and the inner race 28c of the ball bearing 28. The inflow hole 81 is a slot formed on part of a circumference of the annular support portion 25b. The inflow hole 81 is positioned above the input shaft 6.

An oil inflow passage 82 is formed between the wall surface 25c of the case 25, and the ring gear 3R and the ball bearing 28. The oil inflow passage 82 serves as a lubricant inflow passage. The oil stored at the bottom of the case 25 is stirred up to the upper part of the case 25 by the differential ring gear 20, and then flows down through the oil inflow passage 82.

According to the fourth embodiment of the present invention, the inflow hole 81 is formed between the annular support portion 25b of the case 25 and the inner race 28c of the ball bearing 28. In addition, the inflow hole 81 is positioned above the input shaft 6, so that the oil is stirred up to the upper part of the case 25 by the differential ring gear 20, then flows down through the oil inflow passage 82, and is then introduced to inside the ring gear 3R through the inflow hole 81. This allows the transfer gearbox 2 that is formed by the sun gear 3S, the carrier 3C and the ring gears 3R to be lubricated with the oil.

This oil is stored in the oil reservoir 33 to be used for lubricating the transfer gearbox 2 when the vehicle travels in the motor drive mode in which the rotational driving of the engine 1 is stopped. This eliminates the need for the oil pump, and therefore reduces manufacturing costs of the transaxle. In the transaxle according to the aforementioned embodiments of the present invention, the motor shaft 10 of the motor generator MG1 and the motor shaft 12 of the motor generator MG2 are located parallel to (in parallel to) each other. However, it should be understood that the present invention may also be applied to a transaxle in which the motor shaft of the motor generator MG1 and the motor shaft of the motor generator MG2 are located coaxially (in series with each other).

The disclosed embodiments of the present invention are only mere examples in all respects, and the present invention should not be limited to these embodiments. The scope of the present invention is defined not only by the description of the above embodiments, but also by the appended claims, and is intended to include all equivalents covered by the claims and all modifications that fall within the scope of the claims.

As described above, the hybrid drive apparatus and the controller for the hybrid drive apparatus of the present invention exhibit the effect of preventing excessive battery consumption, while allowing the transfer gearbox to be lubricated when the vehicle travels in the motor drive mode in which the rotational driving of the internal combustion engine is stopped. Also, the hybrid drive apparatus and the controller for the hybrid drive apparatus of the present invention are useful to the hybrid drive apparatus and the controller for the hybrid drive apparatus configured to travel in the motor drive mode which uses only the electric motor as a drive power source when the rotational driving of the internal combustion engine is stopped.

What is claimed is:

1. A hybrid drive apparatus comprising:
   a drive power source that includes an internal combustion engine, a first electric motor, and a second electric motor;
   a power transmission mechanism that includes
      a carrier that is coupled to an output shaft of the internal combustion engine and that rotatably supports plural pinion gears,
      a sun gear that is coupled to a rotational shaft of the first electric motor and that meshes with the pinion gears, and
      a ring gear that is coupled to a driving axle side and that meshes with the pinion gears, the power transmission mechanism being configured to rotate the output shaft of the internal combustion engine by the first electric motor; and
   plural bearings that each includes
      an outer ring member that is provided on an inner periphery of the ring gear; and
      an inner ring member that is provided on an outer periphery of a support portion of a case and that is rotatably fitted to the outer ring member through a rolling element,
   the bearings being provided apart from each other in an axial direction of the output shaft and the carrier being positioned between the bearings, wherein
   the bearings are each fitted onto the support portion of the case such that an inner periphery of the outer ring member of the bearing is positioned more inward in a radial direction of the ring gear relative to a meshing portion between inner teeth of the ring gear and outer teeth of one of the pinion gears.

2. The hybrid drive apparatus according to claim 1, further comprising:
   annular members that each cover at least a part of a gap between the outer ring member and the inner ring member, the gap facing the carrier.

3. The hybrid drive apparatus according to claim 2, wherein:
   each annular members includes a radially inner end that is an end on radially inner side, and the radially inner end is positioned more inward in the radial direction of the ring gear relative to the inner periphery of the outer ring member.

4. The hybrid drive apparatus according to claim 1, further comprising:
   discharge holes that are each formed between an inner periphery of the inner ring member and the outer periphery of the support portion of the case.

5. The hybrid drive apparatus according to claim 1, further comprising:
   a lubricant inflow passage that is formed between a wall surface of the case, and the ring gear and one of the plural bearings; and
   an inflow hole that is formed between the inner ring member and the case, and that is positioned above an axis of the output shaft of the internal combustion engine through which the lubricant flowing through the lubricant inflow passage is introduced to inside the ring gear.

6. A controller for a hybrid drive apparatus according to claim 1, comprising:
   a drive mode determining unit that determines whether a drive mode of a vehicle is changed to a motor drive mode; and
   an electric motor controlling unit that controls the first electric motor based on the determination result of the drive mode determining unit, wherein the electric motor controlling unit drives the first electric motor to rotate the output shaft of the internal combustion engine by a predetermined rotational angle when a specific condition is satisfied after the drive mode of the vehicle is changed to the motor drive mode.

7. The controller for a hybrid drive apparatus according to claim 6, wherein
   the specific condition is defined based on a rotation state of the pinion gears since the drive mode of the vehicle is changed to the motor drive mode.

8. The controller for a hybrid drive apparatus according to claim 6, wherein
   the electric motor controlling unit determines that the specific condition is satisfied when a predetermined time elapses since the drive mode of the vehicle is changed to the motor drive mode.

9. The controller for a hybrid drive apparatus according to claim 6, wherein
   the electric motor controlling unit determines that the specific condition is satisfied when the vehicle travels a predetermined distance since the drive mode of the vehicle is changed to the motor drive mode.

10. The controller for a hybrid drive apparatus according to claim 6, wherein
    the electric motor controlling unit determines that the specific condition is satisfied when the second electric motor regenerates electrical energy after the drive mode of the vehicle is changed to the motor drive mode.

* * * * *